(12) United States Patent
Finkemeyer

(10) Patent No.: US 6,513,398 B1
(45) Date of Patent: Feb. 4, 2003

(54) ELECTROMOTIVE ADJUSTMENT ASSEMBLY

(75) Inventor: Horst Finkemeyer, Melle (DE)

(73) Assignee: Dewert Antriebs- und Systemtechnik GmbH & Co. KG, Kirchlengern (DE)

( * ) Notice: Subject to any disclaimer, the term of this patent is extended or adjusted under 35 U.S.C. 154(b) by 0 days.

(21) Appl. No.: 09/705,629

(22) Filed: Nov. 3, 2000

(30) Foreign Application Priority Data

Nov. 11, 1999 (DE) ..................... 299 19 877 U

(51) Int. Cl.⁷ .............. F16H 25/20; F16H 1/16
(52) U.S. Cl. ............ 74/89.28; 74/89.14; 74/89.37; 74/425; 74/427; 74/665 G; 192/141
(58) Field of Search ............. 74/89.14, 89.27, 74/89.28, 89.35, 89.37, 425, 427, 665 GD, 665 G; 192/141

(56) References Cited

U.S. PATENT DOCUMENTS

| | | | | |
|---|---|---|---|---|
| 1,030,034 A | * | 6/1912 | Thorssell et al. | 74/89.28 |
| 1,748,948 A | * | 3/1930 | Gassen | 74/89.35 |
| 1,824,495 A | * | 9/1931 | Osgood | 173/141 |
| 4,682,930 A | * | 7/1987 | Hachisu | 212/204 |
| 5,111,709 A | * | 5/1992 | Torii et al. | 74/89.35 |
| 5,319,991 A | * | 6/1994 | Pierrat | 192/141 |
| 5,427,337 A | * | 6/1995 | Biggs | 248/157 |
| 5,673,593 A | * | 10/1997 | Lafferty | 192/141 |
| 5,809,833 A | * | 9/1998 | Newport et al. | 192/141 |
| 5,875,681 A | * | 3/1999 | Gerrand et al. | 310/83 |
| 5,937,699 A | * | 8/1999 | Garrec | 74/89.35 |
| 6,026,970 A | * | 2/2000 | Sturm et al. | 212/348 |

* cited by examiner

Primary Examiner—William C Joyce
(74) Attorney, Agent, or Firm—Henry M. Feiereisen

(57) ABSTRACT

An electromotive adjustment assembly, includes at least two spindles disposed in parallel spaced-apart relationship, and a motor unit coupled in driving relationship with the spindles for operating the spindles.

20 Claims, 3 Drawing Sheets

ELECTROMOTIVE ADJUSTMENT ASSEMBLY

CROSS-REFERENCES TO RELATED APPLICATIONS

This application claims the priority of German Patent Application Serial No. 299 19 877.4, filed Nov. 11, 1999, the subject matter of which is incorporated herein by reference.

BACKGROUND OF THE INVENTION

The present invention relates, in general, to an electromotive adjustment assembly.

Conventional electromotive adjustment assemblies of a type involved here have two rotatable spindles, whereby each spindle is coupled to a gear motor so that the spindles can be driven independently from one another. Such adjustment assemblies are used, for example, to adjust the head part or foot part of a slatted frame. The spindles are aligned, and each spindle carries an elongate spindle nut, which is secured against executing a rotation movement. Each spindle nut is connected to a lever, which is mounted, for example, in fixed rotative engagement to an axle or shaft of a furniture item being adjusted so as to convert a linear movement into a rotating movement of the structure being adjusted.

So-called single drives are also known which include a spindle that carries a spindle nut. Other drives are known that have a rotating spindle and a gear motor which travels along the spindle as the spindle rotates. In general, the rotation speed of spindles in conventional adjustment assemblies is relatively low because the drive is implemented by a worm drive positioned between the motor unit and the threaded spindle. There is, however an increasing need in some cases, to significantly increase, e.g. to double, the pace of the linearly movable output member and, optionally, to significantly increase the adjustment path, without essentially enlarging the overall size of the adjustment assembly.

SUMMARY OF THE INVENTION

It is thus an object of the present invention to provide an improved electromotive adjustment assembly, obviating the afore-stated drawbacks.

In particular, it is an object of the present invention to provide an improved electromotive adjustment assembly which allows an adjustment of an attached structure at significantly higher speeds, and establishment of a greater adjustment path than previously known, without substantially enlarging the size of the adjustment assembly.

These objects, and others which will become apparent hereinafter, are attained in accordance with the present invention by providing at least two spindles disposed in parallel spaced-apart relationship, and a single motor unit coupled in driving relationship with the spindles for rotating the spindles.

Unlike conventional adjustment assemblies, an adjustment assembly according to the present invention uses a single motor unit so that both spindles can only be operated simultaneously. Depending on the configuration, the linear speed of the output member of the adjustment assembly can be significantly increased because the velocities of the components moved by the spindles add up. Moreover, it is also possible by suitably configuring the adjustment assembly to enlarge the adjustment path.

There are many applications for an adjustment assembly according to the present invention. For example, it is possible to install the adjustment assembly according to the present invention in a column to lift, e.g., the table top of a work table. Moreover, it can be integrated in a tubular table leg of a table.

In accordance with a simple embodiment of the present invention, the spindles can be driven by a same number of drive wheels which are in mesh with a gear member driven by the motor unit. The drive wheels are then the driving component of the drive for the spindles. As the rotation speed of the spindles should also be relatively low in an adjustment assembly according to the present invention, the gear member and the drive wheels define a gear mechanism in the form of a reduction gear unit. An especially high speed ratio between the output member (output journal) of the motor unit, e.g. an electric motor, and the spindles can be realized when the drive wheels for the spindles are identical worm wheels which extend at an angular offset of 180°, and when the gear member being rotated by the motor unit is a worm wheel. Both spindles are then driven in opposite directions, whereby their speeds are the same when the worm wheels are identical.

According to another feature of the present invention, the worm wheels may suitably be provided with semi-globoid toothed surface.

The adjustment path and the velocity of the structure being attached to the output member of the adjustment assembly can be significantly increased, compared to conventional adjustment assemblies, when one worm wheel has an internally threaded bore to form a movement-permitting thread, for engagement with a first one of the spindles, and the other worm wheel is connected in fixed rotative engagement on the other second spindle. As a consequence, there are several options for implementing the adjustment. According to one variation, the first threaded spindle can be non-rotatable so that the attached worm wheel travels along the threaded spindle. When using the adjustment assembly for a liftable column or for a table leg, the tabletop to be vertically adjustable could then be connected via a coupling element with the second threaded spindle. Provision should then be made that the gear motor comprised of the worm and both worm wheels as well as the motor unit is guided in a guide of the column or the table leg. According to another variation, the gear mechanism in the form of worm wheels and worm is stationary so that the first threaded spindle can travel in linear direction relative to the associated worm wheel. In order to increase the adjustment speed and the adjustment path, the enclosing tube of the adjustment assembly should then be of telescoping configuration.

In an adjustment assembly according to the present invention, the second spindle in fixed rotative engagement with driving worm wheel is normally connected with the structure being adjusted, for example a tabletop, via additional components. Therefore, it is proposed to mount onto the second spindle a spindle nut which is secured against executing a rotation movement so as to travel only in a linear direction. Suitably, the spindle nut is connected to a lifting or thrust tube which thus moves in and out in accordance with the travel of the spindle nut. The lifting or thrust tube is surrounded by a flanged tube which accommodates also a holed rail for attachment of limit switches by which the travel of the spindle nut is limited between predetermined end positions. The positions of the limit switches may be modified to the situation at hand so that applications in which the entire travel path of the spindle nut cannot or should not be exploited can also be satisfied. In the case at hand, the limit switches are determinative for the lift of the entire drive.

According to another feature of the present invention, the spindles are supported at their end zones that are associated to the worm wheels by bearings, suitable rolling-contact bearings. In order to keep the distance between the spindles to minimum to realize a compact construction, it is proposed to provide the bearings for support of each spindle with different diameters, whereby diagonally opposite bearings have a same diameter.

Suitably, the worm wheels in engagement with the driving worm are disposed offset to another at an angle of 180°.

According to another feature of the present invention, the drive wheels are defined by center planes disposed perpendicular to a rotation axis of the worm, with the center planes of the drive wheels extending offset to one another and at a distance to the rotation axis of the worm to thereby provide access to fastening elements. Hereby, the offset of each worm wheel with respect to the rotation axis of the worm is the same. This offset can be realized in a simple manner by providing the circumferential toothed surface of the worm wheels of semi-globoid configuration.

The spindles may or may not have a same pitch. It is also possible to so configure an electromotive adjustment assembly according to the present invention as to be self-locking. In situations in which the structure being adjusted is exposed to extremely great forces, there is, of course, the option to equip an electromotive adjustment assembly according to the present invention with a holding brake, for example in the form of at least one wrap spring. Certainly, if an electromotive adjustment assembly according to the present invention is not self-locking, the provision of a suitable brake is required in any event.

As an alternative to the use of limit switches for defining the end positions of the linearly moving components, for example the spindle nut or the lifting or thrust tube, it is also possible to define each end position by an mechanical blocking device, preferably in the form of a stationary or adjustable stop member which interacts with an electrical measuring. The measuring device registers an increase of a current strength in the motor unit when a linearly moving component strikes against the stop member, and forms a commensurate signal for cutting the motor unit. Another possibility is the provision of an electric and/or optic recognition device to define the end positions. An example of such a device includes proximity switches or the like. Conceivable are also position-determination devices for defining the end positions, which are so configured that the motor unit is cut when the linearly moving components occupy a predetermined position. Another variation includes the determination and optional storage of revolutions of rotating components so that a signal can be formed by an evaluation unit for cutting the motor unit when the linearly moving component occupies a predetermined position, based on the correlation between number of revolutions and advanced travel path. Rotating components in adjustment assemblies involved here is the rotor of the motor unit or the spindle. It is also feasible to register the revolutions of the gear members of the reduction gear unit, or the revolutions of those gear members that are disposed in the power train ahead of the reduction gear unit. Finally, it is also possible to measure the path covered by the linearly moving components.

An electromotive adjustment assembly according to the present invention has the advantage that the torque being transmitted is distributed onto the spindles, so that the service life of the spindles can be enhanced and the overall size can be reduced, and the use of qualitatively inferior materials may be used.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
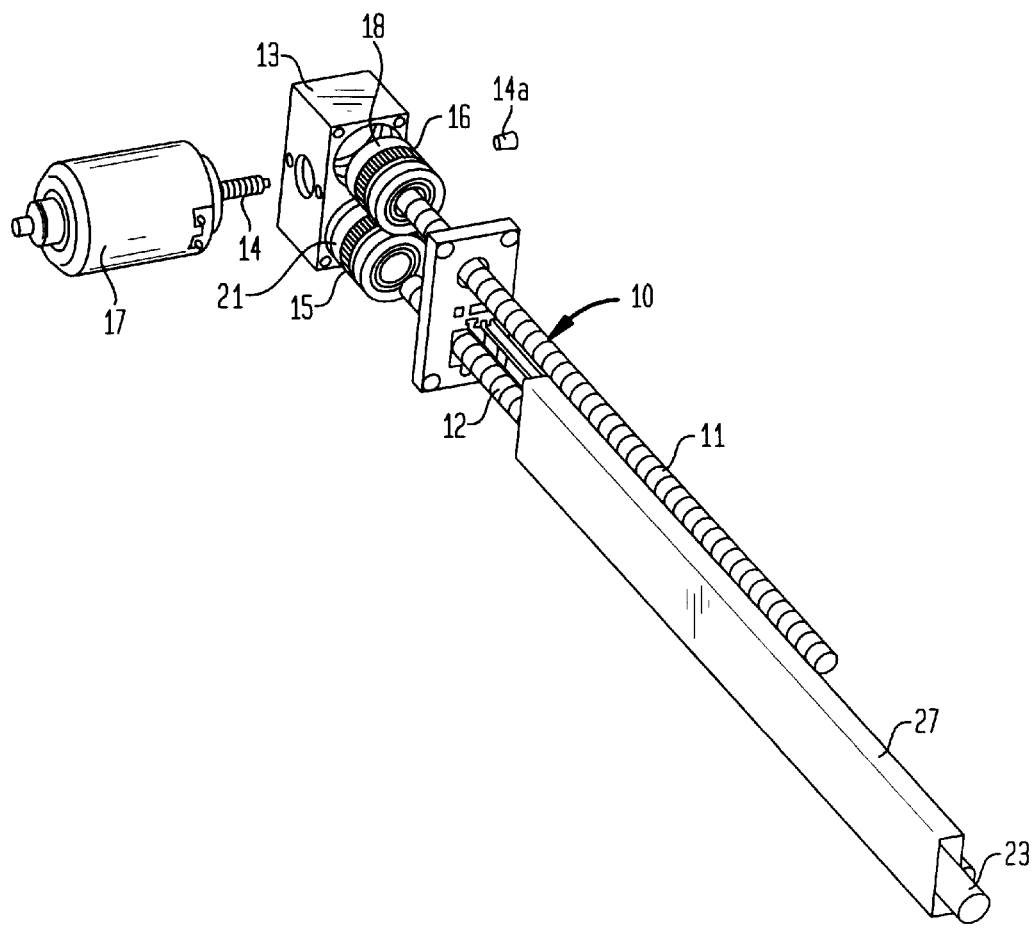
FIG. 1 is a perspective, exploded illustration of one embodiment of an electromotive adjustment assembly according to the present invention.

Throughout all the Figures, same or corresponding elements are generally indicated by same reference numerals.

Turning now to the drawing, and in particular to FIG. 1, there is shown a perspective, exploded illustration of one embodiment of an electromotive adjustment assembly according to the present invention, generally designated by reference numeral 10, in telescoping configuration. The electromotive adjustment assembly 10 includes two spindles 11, 12 in parallel, spaced-apart relationship. One end of the spindles 11, 12 is received in the retracted state, shown in FIG. 2, in a housing 13 which further accommodates a gear member in the form of a worm 14, which is held in place by holding member 14a, and two drive wheels in the form of worm wheels 15, 16 in mesh with the worm 14. The worm 14 is driven by an electric motor 17, e.g. a dc motor, flange-mounted to the housing 13. In the non-limiting example of FIG. 1, the output journal of the electric motor 17 constitutes the worm 14, and both worm wheels 15, 16 are of identical configuration so that the spindles 11, 12 rotate in opposite directions.

Figure 2:
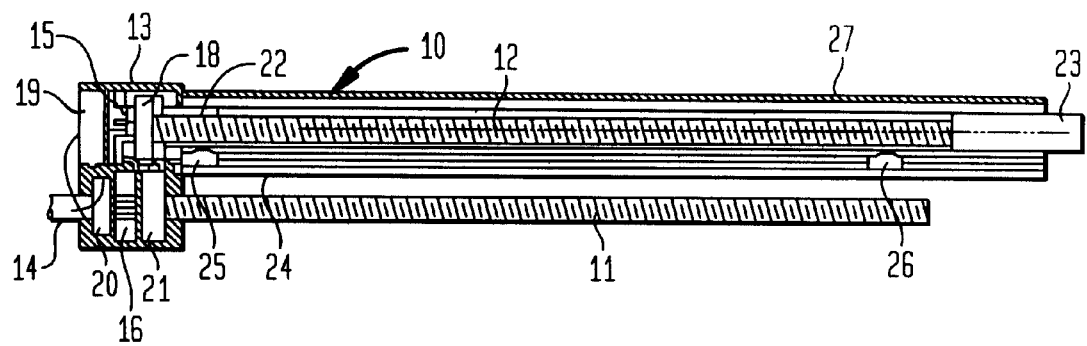
FIG. 2 is a partially sectional view of the electromotive adjustment assembly of FIG. 1 in fully assembles state.

As shown in FIG. 2, the spindles 11, 12 are supported on both sides of the worm wheels 15, 16 by rolling-contact bearings 18, 19; 20, 21, whereby the bearings 18, 19 for supporting the spindle 11 have different outer diameter, and the bearings 20, 21 for supporting the spindle 12 have different outer diameter, and whereby diagonally opposite bearings of the two pairs of bearings 18–21 have same diameter and are thus identical, i.e. the bearing 18 of the one pair of bearings 18, 19 has a same diameter as the bearing 20 of the other pair of bearings 20, 21, and the bearing 19 has a same diameter as the bearing 21. In this manner, the distance between the spindles 11, 12 is kept to a minimum to thereby realize a very compact electromotive adjustment assembly.

Figure 3:
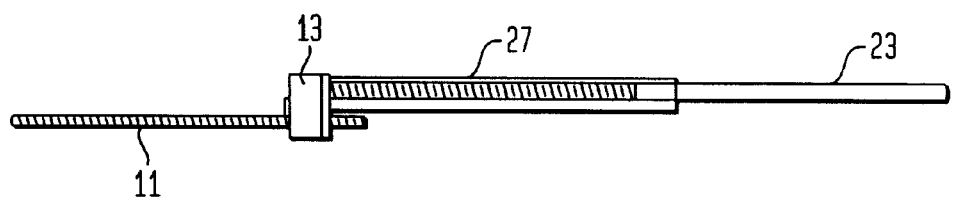
FIG. 3 is a schematic illustration of one variation to implement an adjustability of moving components.

The worm wheel 16 mounted on the spindle 11 is formed with an internal threaded bore. This type of thread is a motion-permitting thread so that a turning of the worm wheel 16 results in a movement of the spindle 11 to the left, as shown in FIG. 2 by way of example, when the housing 13 is stationary and the spindle 11 is secured against executing a rotation movement.

variation of mobility is shown in FIG. 3, in which the spindle 11 is so mounted as to be non-rotatable and immobile in linear direction. In this case, the housing 13 is moved to the right. The electric motor 17 drives at the same time the worm wheel 15, thereby rotating the spindle 12. Mounted on the spindle 12 is a spindle nut 22 which is secured against executing a rotation movement so that a rotation of the spindle 12 is translated into a linear movement of the spindle nut 22 along the spindle 12. The spindle nut 22 is connected to a lifting or thrust tube 23 which thus moves in synchronism with the spindle nut 22. Although not shown in the drawing, additional connection parts are provided to link the lifting or thrust tube 23 to the structure to be adjusted, e.g. a tabletop.

As further shown in FIGS. 1 and 2, the lifting or thrust tube 23 is enclosed by a stationary flanged tube 27 which is mounted to the housing 13 and accommodates a holed rail 24 (FIG. 2) for selective attachment of spaced-apart limit switches 25, 26 for defining end positions of the spindle nut 22.

Figure 4:
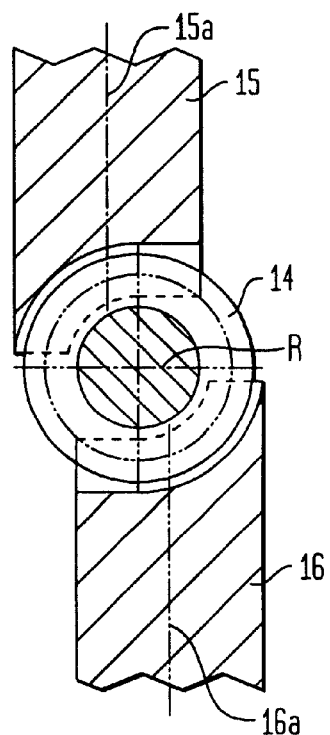
FIG. 4 is a sectional view of the electromotive adjustment assembly, showing in detail two worm wheels in mesh with a worm.

Turning now to FIG. 4, there is shown a sectional view of the two worm wheels 15, 16 in mesh with the worm 14. The worm wheels 15, 16 are defined by center planes 15a, 16a which extend perpendicular to the rotation axis R of the worm 14 at a same offset thereto. In this way, free spaces are created to provide accessibility, for example, for fastening elements. The outer peripheral toothed surface of each worm wheel 15, 16 has a semi-globoid configuration.

The type of thread of the spindles 11, 12 may be any of the common thread types, for example, trapezoid thread or V-thread. The pitch of both spindles 11, 12 may or may not be the same. Depending on the application at hand, the pitches may be in a same or opposite direction. When the electric motor 17 is switched on, both spindles 11, 12 are driven in opposite directions via the worm 14 and both worm wheels 15, 16.

In the embodiment of FIG. 3, the spindle 11 is non-rotatable so that a rotation of the worm wheel 16 is translated in a linear movement of the housing 13 along the spindle 11. At the same time, also the spindle nut 22 and thus the lifting and thrust tube 23 moves out, so that the velocity and the travel path increase compared to conventional adjustment assemblies. When integrating the adjustment assembly 10 in a column or table leg, provision should be made that the housing 13 is guided within the column or leg to prevent a rotation of the housing 13. Of course, it is also possible to secure the housing 13 in fixed disposition within the column and the leg. In this case, the column or the leg should be telescoping for increase of the velocity and the travel path.

Figure 5:
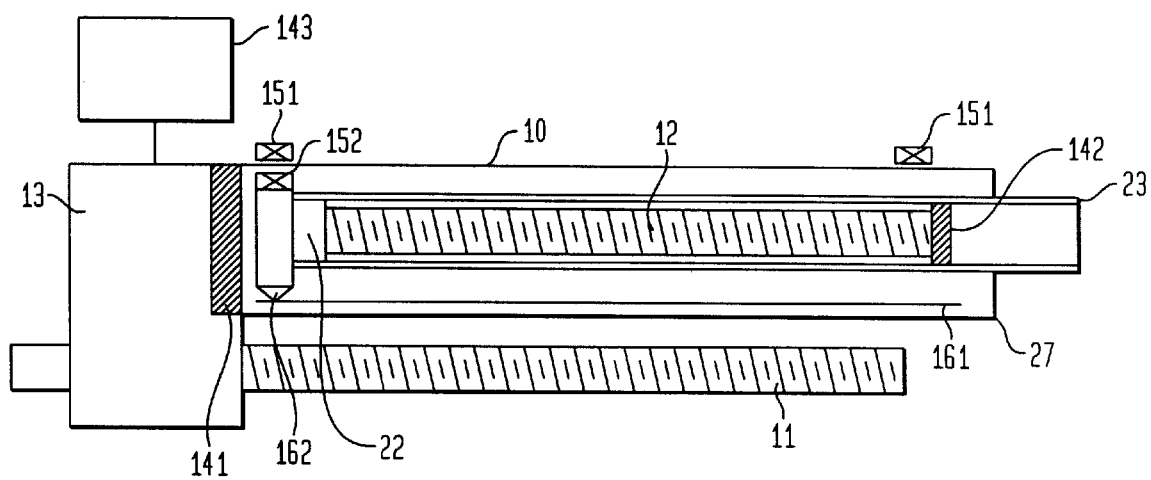
FIG. 5 is a schematic illustration of the electromotive adjustment assembly according to the present invention, showing different options to restrict a travel of linearly moving components between desired end positions.

As an alternative to the use of the limit switches 25, 26 for defining the end positions of the linearly moving components, for example the spindle nut 22 or the lifting or thrust tube 23, it is also possible to define each end position by other systems, as will now be described with reference to FIG. 5. One variation includes a mechanical blocking device, preferably in the form of a stationary or adjustable stop member 141, 142 which interacts with an electrical measuring 143. The measuring device 143 registers an increase of a current strength in the electric motor 17, when a linearly moving component strikes against either one of the stop members 141, 142, and forms a commensurate signal for cutting the electric motor 17. Another possibility is the provision of an electric and/or optic recognition device 151, 152 to define the end positions. In an optic recognition device, element 151 may be a reflection light scanner and element 152 may be a reflector on the spindle nut 22, whereas in an electric recognition device element 151 may be an inductive proximity switch (Hall sensor) 151 and element 152 may be a magnet on the spindle nut 22. Another variation for defining the end positions of linearly moving components includes the provision of a position-determination device 161, 162, which is so configured that the electric motor 17 is cut when the linearly moving components occupy a predetermined position. Element 161 may be resistance track, e.g. a plastic linear potentiometer, and element 162 may be a slider or pressure ring, disposed on the spindle nut 22. Available are, for example, conductor foils which change their resistance in dependence on the position of a pressure point with respect to a reference point.

Figure 6:
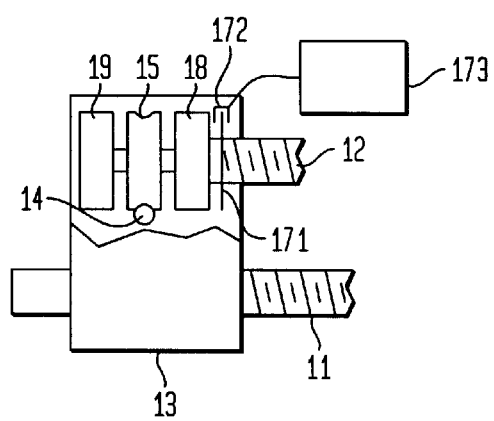
FIG. 6 is a fragmentary, schematic illustration of the electromotive adjustment assembly according to the present invention, showing another variation to restrict a travel of linearly moving components between desired end positions.

FIG. 6 shows another variation of a device 171, 172 for defining the end positions by determining and optional storage of revolutions of rotating components so that a signal can be formed by an evaluation unit 173 for cutting the electric motor 17 when the linearly moving component occupies a predetermined position, based on the correlation between number of revolutions and advanced travel path. Rotating components in adjustment assemblies involved here, is the rotor of the electric motor 17 or the spindle 12. Element 171 may be a perforated disk on the spindle 12, and element 172 may be a respective light barrier. Of course, the perforated disk 171 and the light barrier 172 may also be located on the motor shaft. It is also feasible to register the revolutions of the gear members of the reduction gear unit, or the revolutions of those gear members that are disposed in the power train ahead of the reduction gear unit.

While the invention has been illustrated and described as embodied in an electromotive adjustment assembly, it is not intended to be limited to the details shown since various modifications and structural changes may be made without departing in any way from the spirit of the present invention.

What is claimed as new and desired to be protected by Letters Patent is set forth in the appended claims:

1. An electromotive adjustment assembly, comprising:
    at least two spindles disposed in parallel spaced-apart relationship;
    a motor unit coupled in driving relationship with the spindles for operating the spindles; and
    at least two drive wheels, one of the drive wheels provided for driving one of the spindles and the other one of the spindles provided for driving the other one of the spindles, and a gear member in engagement with the drive wheels and driven by the motor unit,
    wherein the motor unit is an electric motor and the gear member is a worm driven by the electric motor, said drive wheels being worm wheels disposed at an angular offset of 180° and in mesh with the worm, said worm wheels having a semi-globoid toothed surface.

2. The adjustment assembly of claim 1 wherein the number of spindles and the number of drive wheels are the same.

3. The adjustment assembly of claim 2 wherein the drive wheels are worm wheels of identical configuration.

4. The adjustment assembly of claim 1 wherein a first one of the drive wheels has an internally threaded bore formed as movement-permitting thread which is in engagement with a first one of the spindles.

5. The adjustment assembly of claim 4 wherein a second one of the drive wheels is secured in fixed rotative engagement with a second one of the spindles.

6. The adjustment assembly of claim 5, and further comprising a spindle nut mounted on the second spindle and moveable in longitudinal direction of the second spindle only.

7. The adjustment assembly of claim 6, and further comprising a lifting or thrust tube having one end secured to the spindle nut and another end linked to a structure to be adjusted.

8. The adjustment assembly of claim 7, and further comprising a mechanical blocking device interacting with an electric measuring device for cutting the motor unit when the spindle nut and the lifting or thrust tube, during their conjoint movement in a linear direction, reach an end position.

9. The adjustment assembly of claim 7, and further comprising an electric and/or optic recognition device for cutting the motor unit when the spindle nut and the lifting tube, during their conjoint movement in a linear direction, reach an end position.

10. The adjustment assembly of claim 7, and further comprising a measuring device for determining end positions of linearly moving components by monitoring a travel path of the linearly moving components.

11. The adjustment assembly of claim 7, and further comprising a device for determining revolutions of rotating components, and, optionally, storing measured values and evaluating the measured values by an evaluation unit.

12. The adjustment assembly of claim 4 wherein the first spindle is non-rotatable so that the attached first drive wheel travels along the first spindle.

13. The adjustment assembly of claim 12 for accommodation in one of a fixed column, a table leg and telescopic leg.

14. The adjustment assembly of claim 4 wherein the drive wheels and the gear member form a gear mechanism and are stationary, so that the first spindle travels relative to the first drive wheel.

15. The adjustment assembly of claim 14 and further comprising a housing, said gear mechanism being fixed in place within the housing.

16. The adjustment assembly of claim 1, and further comprising bearing means for supporting end zones of the spindles on both sides of the drive wheels.

17. The adjustment assembly of claim 16 wherein the bearing means include a pair of first bearings for supporting a first one of the spindles, and a pair of second bearings for supporting a second one of the spindles, said bearings of each of the pairs of bearings having different outer diameter whereby diagonally opposite bearings have a same diameter for reducing a distance of the spindles.

18. The adjustment assembly of claim 1 wherein the drive wheels are defined by center planes disposed perpendicular to a rotation axis of the gear member, said center planes of the drive wheels extending offset to one another and at a distance to the rotation axis of the gear member.

19. The adjustment assembly of claim 18 wherein the offset of the center planes of the drive wheels is the same as the distance of the center planes to the rotation axis of the gear member.

20. The adjustment assembly of claim 1, and further comprising a flanged tube for accommodating one of the spindles, and limit switches for defining a total lift of the adjustment assembly.

* * * * *